United States Patent
Shinozaki et al.

(10) Patent No.: US 6,489,023 B1
(45) Date of Patent: Dec. 3, 2002

(54) SEALANT COMPOSITIONS AND SEALANT ARTICLES USING THE SAME

(75) Inventors: Kotaro Shinozaki, Yokohama-Kanagawa pref (JP); Kazuyoshi Shiozaki, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/868,703
(22) PCT Filed: Dec. 20, 1999
(86) PCT No.: PCT/US99/30325
§ 371 (c)(1), (2), (4) Date: Jun. 20, 2001
(87) PCT Pub. No.: WO00/39235
PCT Pub. Date: Jul. 6, 2000

(30) Foreign Application Priority Data

Dec. 28, 1998 (JP) .............................. 10-373892

(51) Int. Cl.$^7$ .............................. B32B 27/38
(52) U.S. Cl. .............................. 428/355 EP; 428/355 R; 525/113; 525/114
(58) Field of Search .............................. 525/113, 114, 525/423, 438; 428/355 EP, 355 R

(56) References Cited

U.S. PATENT DOCUMENTS

| | | | |
|---|---|---|---|
| 3,616,963 A | * 11/1971 | Sinnott ..................... 220/81 |
| 4,517,340 A | 5/1985 | Read et al. .................. 525/113 |
| 4,560,579 A | 12/1985 | Siadat et al. ................ 427/45.1 |
| 4,707,388 A | 11/1987 | Park et al. ...................... 428/36 |
| 4,820,367 A | * 4/1989 | Cuzin ......................... 156/283 |
| 5,034,251 A | 7/1991 | Read et al. .................. 428/34.9 |
| 5,086,088 A | 2/1992 | Kitano et al. ................ 522/170 |
| 5,296,556 A | 3/1994 | Frihart ..................... 525/420.5 |
| 5,296,557 A | 3/1994 | Frihart ........................ 525/423 |
| 5,612,448 A | 3/1997 | Frihart ..................... 528/339.5 |
| 6,030,701 A | 2/2000 | Johnson et al. ............. 428/343 |
| 6,046,257 A | * 4/2000 | Oosedo et al. .............. 523/428 |

FOREIGN PATENT DOCUMENTS

EP 0798354 6/2000

* cited by examiner

Primary Examiner—Robert Dawson
Assistant Examiner—Christopher M. Keehan
(74) Attorney, Agent, or Firm—Harold C. Knecht, III

(57) ABSTRACT

A sealant composition comprising a curable epoxy-containing material, a thermoplastic polyamide component having a melting point lower than a curing temperature of the epoxy-containing material, and a curative for the epoxy-containing material. After curing of the epoxy-containing material, the sealant composition exhibits an elongation at −20° C. of at least 2. The sealant composition is capable of effectively sealing discontinuities while maintaining enough flexibility to absorb applied stress, thereby preventing the formation of defects in the sealant which permit the intrusion of dirt, moisture, and other undesirable substances.

35 Claims, 3 Drawing Sheets

SEALANT COMPOSITIONS AND SEALANT ARTICLES USING THE SAME

This application claims the benefit of priority to International Patent Application No. PCT/US99/30325 filed on Dec. 20, 1999, which claims priority to Japanese Patent Application No. 10373892 filed on Dec. 28, 1998.

FIELD OF THE INVENTION

This invention relates to sealant compositions and sealant articles and, more particularly, to compositions for sealing discontinuities, for example of the type found in motor vehicles, and to articles used in sealing the discontinuities, as well as to methods of sealing the discontinuities.

BACKGROUND

Motor vehicles such as, for example, automobiles and trucks have metal joints and seams that must be sealed. One example is a generally non-planar overlap joint formed by welding together two panels (e.g., the roof and the side panel) of the vehicle, such as that often used in motor vehicles to create the U-shaped trough or channel called a roof ditch. One purpose of the roof ditch is to collect and drain water away from the sides of the vehicle.

To prevent water from seeping through the overlap joint formed in the U-shaped trough, it is necessary to seal the joint. It is often difficult to obtain a good seal, because the joint is overlapping and not planar. In addition, the width of the roof ditch typically varies along its length, further complicating the ability to provide a good seal. A variety of materials have been used to seal roof ditch joints, as well as sealants to fill voids in motor vehicles and to block the passage of dirt, moisture, and other undesirable substances.

Sealants have been supplied as liquid or solid materials depending upon the requirements of the particular application. In the automotive industry, for instance, roof ditch joints have been sealed using a paste-like plastisol which is then painted, baked and cooled to room temperature. Hot melt sealants have also been used and are generally solid thermoplastic materials which quickly melt with heating and then form a firm bond upon cooling. In use, a bead of molten liquid sealant is applied on the joint or seam, much in the way caulking is applied. A worker then brushes or levels the material. Applying such a sealant properly takes skill and, because of human error, often results in a poorly sealed joint or seam. Such hot melt sealants are undesirable for visible applications due to their non-uniform appearance. A typical hot melt sealant composition utilizes polyolefins that can be difficult to paint and which have poor adhesion to non-porous metallic surfaces, such as steel and aluminum.

Recently there has been a trend towards more "user-friendly" polyvinyl chloride-based sealants that are provided in the form of a rope or a tape. The sealants in such a form are disclosed in Japanese National Publication (Kohyo) No. 9-505335. The handling properties of these sealant materials permit faster installation and eliminate the need to finesse the material after application.

Once the sealant has been applied, its exposed surface may be covered with a plastic or rubber article (for example, a molding, cap, etc.) having a flexible top surface, which article may be painted, for example to match or complement the color of the vehicle exterior. Alternatively, the exposed surface of the sealant may be covered with a metal article. The article is typically attached to the sealant surface using a mechanical fastener or a pressure sensitive adhesive.

During its life, the motor vehicle may be exposed to very cold temperatures of −20° C. or lower, for example, −30 to −40° C., especially if the vehicle is destined for use in extreme northern climates. Prior sealants that are used under such severely cold conditions, particularly those that may be used in roof ditch applications, have been known to exhibit defects such as, for example, cracking, breaking, delaminating or lifting up from the surface to which it has been applied resulting from stresses caused by ordinary vehicle use. Such a defect in the sealant not only permits the intrusion of dirt, moisture, and other undesirable substances but can cause a subsequently applied article (e.g., a molding, cap, etc.) to become loose.

Therefore, a need exists for a solution to the problems described above. In particular, for example, there is a need for a sealant composition and a sealant article capable of effectively sealing discontinuities while remaining flexible enough at lower temperatures to survive the stresses encountered while in use and, thereby, prevent the intrusion of dirt, moisture, and other undesirable substances through the seal.

SUMMARY OF THE INVENTION

According to one aspect of the present invention, there is provided a sealant composition comprising a curable epoxy-containing material; a thermoplastic polyamide component having a melting point lower than a curing temperature of the epoxy-containing material; and a curative for the epoxy-containing material; wherein elongation at −20° C. becomes at least 2% as a result of curing of the epoxy-containing material.

In one preferred embodiment of the present invention, the sealant composition according to the present invention comprises 10–60% by weight of the epoxy-containing material and 30–70% by weight of the thermoplastic polyamide component.

According to another aspect of the present invention, there is also provided a sealant article comprising a formed sealant layer of a sealant composition of the present invention (hereinafter also referred to as a "first layer").

In another preferred embodiment of the present invention, the sealant article according to the present invention is provided with an adhesive layer (hereinafter also referred to as a "second layer") on one surface of the sealant layer (first layer). The second layer (that is, the adhesive layer) preferably comprises a plurality of adhesive microspheres.

In still another embodiment of the present invention, the surface of the second layer having an adhesive property is provided with a release layer on which a plurality of protrusions are formed, and the protrusions are at least in contact with the second layer.

In a further embodiment of the present invention, a flexible layer (hereinafter also referred to as a "third layer") is further provided on the sealant layer. Being flexible, the third layer may be disposed at any position, for example, it may be disposed in the sealant layer. Alternatively, it may be attached to the other surface of the sealant layer (i.e. the surface opposite the second layer).

EMBODIMENTS FOR CARRYING OUT THE INVENTION

The present invention will be described in detail in accordance with the following embodiments. It will be easily understood by persons skilled in the art that the present invention is not limited to the following embodiments.

Figure 1:
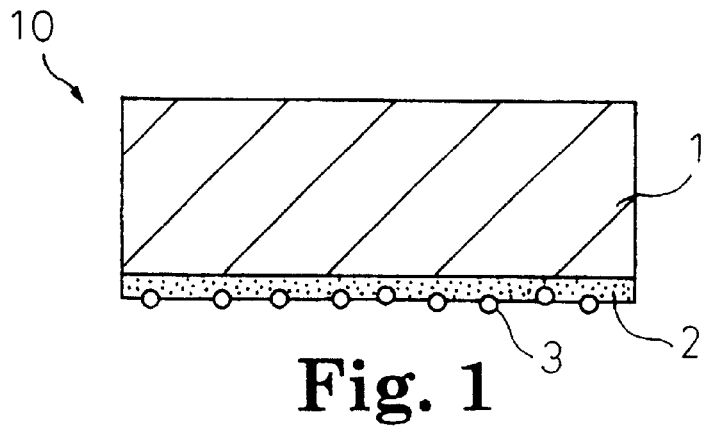
FIG. 1 is a cross-sectional view showing one preferred embodiment of a sealant article according to the present invention.

In the cross-sectional view of FIG. 1, a sealant article 10 using a sealant composition of the present invention is schematically shown. This sealant article 10 comprises a sealant layer or first layer 1 of the sealant composition, and is in the shape of a rope, tape, strip or other such structure. When this first layer 1 is disposed at a predetermined position over discontinuities (for example, overlap joint or seam, butt joint or seam, recess or indentation, or a manufacturing defect), the sealant composition constituting the layer 1 forms a protective seal portion to coat the discontinuities, thereby making it possible to prevent moisture, dirt, snow, and other undesirable substances from intruding into the discontinuities and cause corrosion.

The sealant compositions may be regarded as melt-flowable. That is, when placed over the joint and heated, the sealant composition first softens and conforms to the surface of the discontinuity, thereby pushing out trapped air. Further into the heating cycle, as the composition becomes hotter, it becomes tacky, and bonds to the surface. The sealant composition is thermosetting such that it cures (i.e., covalently crosslinks) upon heating and resists flowing following cooling and re-heating.

The sealant compositions of the invention, once cured, exhibit excellent flexibility at low temperatures and, as described more fully hereinbelow, can be easily bent about a mandrel without cracking or breaking. Preferably, each of the cured sealant compositions possess at least 10% elongation when tested at −20° C., however, this is not intended to be restrictive. Basically, the cured sealant compositions, when tested at −20° C., possess at least 2% elongation. In such a case, the paints used in motor vehicles, especially automotive paints, will exhibit a degree of elongation when tested at −20° C. that is substantially identical to or lower than that of the cured sealant composition. As a result, even if the cured sealant composition is applied and the above paints are coated over the exposed sealant composition, it becomes possible to prevent cracking or breaking of the sealant composition, prior to cracking or breaking of the coated paints. Accordingly, the sealant composition can retain its integrity over the discontinuities, thereby avoiding the intrusion of dirt, moisture, snow and other undesirable substances therein.

The sealant compositions of the invention in the first layer 1 can comprise, and more preferably consist essentially of, an epoxy-containing material, a thermoplastic polyamide component, and a curative for the epoxy-containing material. The epoxy-containing material contributes to the ultimate strength and heat resistance of the sealant composition, while the thermoplastic polyamide component provides conformability, pliability and flexibility, especially at low temperatures. The curative permits the composition to cure. Preferably, the curative is thermally-activated such that the composition cures upon exposure to an appropriate heat source for an appropriate period of time.

Useful epoxy-containing materials are epoxy resins that have at least one oxirane ring polymerizable by a ring opening reaction. Such materials, broadly called epoxides, include both monomeric and polymeric epoxides and can be aliphatic, cycloaliphatic, or aromatic. These materials generally have, on the average, at least two epoxy groups per molecule and preferably more than two epoxy groups per molecule. Such materials may be referred to as polyepoxides and include epoxy-containing materials in which the epoxy functionality is slightly less than 2.0, for example, 1.8. The "average" number of epoxy groups per molecule is defined as the number of epoxy groups in the epoxy-containing material divided by the total number of epoxy molecules present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyl) adipate. Further epoxy-containing materials which are particularly useful are glycidyl ether monomers such as glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol) propane).

There are a number of commercially available epoxy-containing materials that can be used in the practice of the present invention. That is, they are commercially available under the trade designations EPIKOTE 1001, EPIKOTE 1002, EPIKOTE 1003, EPIKOTE 1004, EPIKOTE 8028 and EPIKOTE 154 from Yuka Shell Chemical Co.

The sealant compositions of the invention also include a thermoplastic polyamide component. A thermoplastic polyamide component refers to a polymeric material containing amide moieties,

which material possesses thermoplastic processing characteristics. That is, the thermoplastic polyamide material softens and flows upon heating so that it can be shaped, and then hardened upon cooling. Upon reheating, the material becomes soft again. The thermoplastic polyamide component achieves the desired miscibility with the epoxy-containing material as well as other sealant composition ingredients that do not promote curing of the epoxy-containing material. The thermoplastic polyamide component also contributes to the excellent low temperature properties of the sealant composition, particularly flexibility thereof.

The desired thermoplastic polyamide component is blended with the epoxy-containing material in the melt phase (i.e. melt-blending) and, preferably, forms a homogeneous single phase mixture when the epoxy-containing material is not cured. Formation of the homogeneous single phase becomes clear when such a mixture (melt-mixture) becomes transparent. Preferably, from about 90 parts to about 350 parts by weight of a polyamide component is blended with about 100 parts by weight of the epoxy-containing material. When the polyamide component is present in the amount of about 90 parts by weight or less per 100 parts by weight of the epoxy-containing material, the cured sealant composition is liable to become brittle. On the other hand, when the polyamide component is present in the amount of about 350 parts by weight or more per 100 parts by weight of the epoxy-containing material, the cured sealant composition is not sufficiently cured and is liable to flow by re-heating. When the epoxy-containing material is cured, a composition of two separate phases or a lot of phases is formed as a result. One phase is derived from the cured epoxy-containing material, and another phase is derived from the thermoplastic polyamide component. When both phases are formed from the homogeneous single phase comprising the epoxy-containing material and thermoplastic polyamide component, both phases are distributed homogeneously, even if the epoxy-containing material is cured as described above. Accordingly, characteristics due to the epoxy-containing material and thermoplastic polyamide component are imparted to the sealant composition. Some degree of non-homogeneity of the blended thermoplastic polyamide component may be acceptable as long as the desired characteristics are imparted to the sealant composition.

Furthermore, the desirable thermoplastic polyamide component has a melting point that is not more than the curing temperature of the epoxy-containing material, in order to inhibit the epoxy-containing material from curing upon the heating and sealing of the sealant composition on a desired surface. Furthermore, the sealant composition is molten by heating, thereby making it easier to intrude into the discontinuities. When the sealant composition is used in the automobile industries, the thermoplastic polyamide component usually has a melting point of not more than about 180° C.

The sealant composition includes a curative for curing the epoxy-containing material. Preferably, the curative is thermally activated so as to effect curing or hardening of the epoxy-containing material under the influence of heat. For example, useful thermally activated curatives include amide group containing amine, and imidazole. Preferably, the curative having an amide group is typically dicyanediamide. Preferably, the curative having an imidazole is typically a triazine derivative. Dicyaneamide curatives are commercially available from ACR Co. under the trade name of "EH3636". Triazine derivative curatives are commercially available form Shikoku Chemical Co. under the trade name of "2MZA".

Furthermore, the sealant composition may optionally contain additives, for example, fillers such as calcium and silica powders, antioxidants commercially available from Ciba-Geigy Corp. under the trade name of "IRGANOX 1010", ultraviolet absorbers commercially available from Ciba-Geigy Corp. under the trade name of "TINUVIN™ P", and surfactants commercially available from Minnesota Mining and Manufacturing Company under the trade name of "FC36".

The sealant composition in the first layer (sealant layer) 1 is solid at room temperature. A slight amount of tackiness at or slightly below room temperature is desirable for helping to initially position the sealant composition or an article containing the sealant over a joint or a seam, such as in a motor vehicle roof ditch 12. However, when the sealant composition is in the shape of a rope, tape, strip or similar structure, it becomes possible to attach rapidly and to eliminate the need of skill and labor for treating the sealant composition after application (for example, forming the applied sealant material with an acceptable appearance). It is expected that the sealant composition of the present invention can be substantially tack-free at room temperature. In the case of the substantially tack-free sealant composition, as shown in FIG. 1, an optional second layer 2, having an adhesive property, is preferably provided on one surface of the first layer 1, containing the sealant composition. This is one way that the substantially tack-free sealant composition can be still be positioned as described above.

Figure 6:
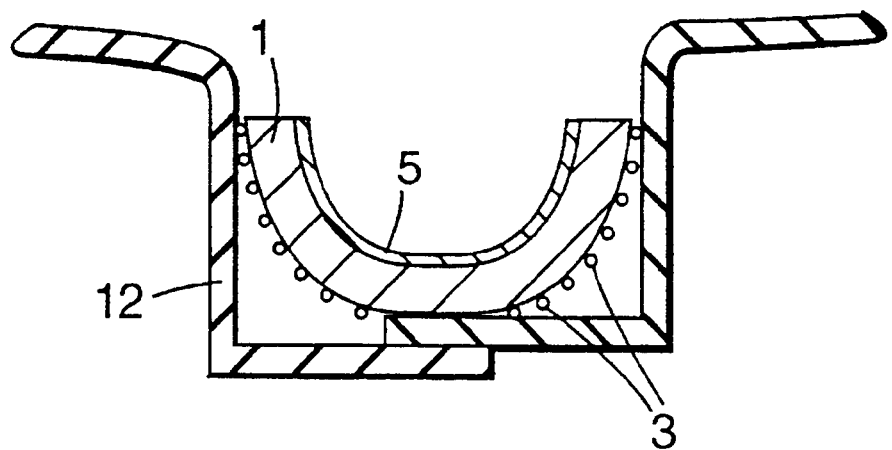
FIG. 6 is a cross-sectional view showing an additional embodiment of a sealant article according to the present invention situated in an automobile roof ditch prior to heating.
Figure 7:
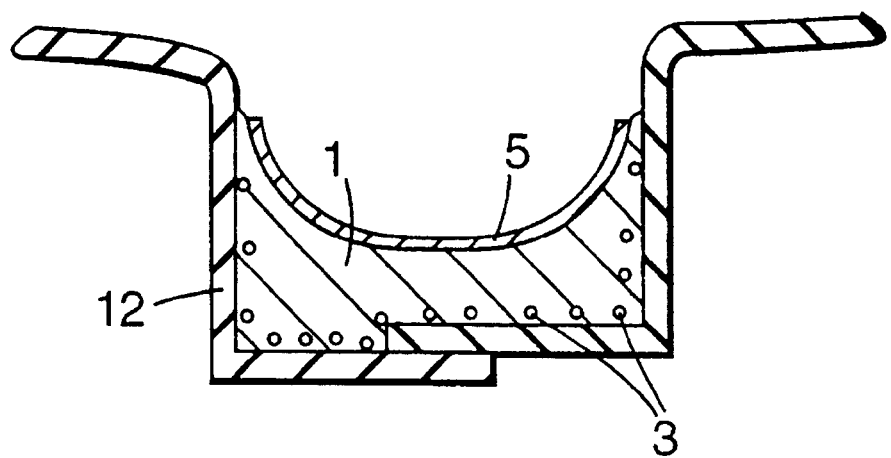
FIG. 7 is a cross-sectional view showing the sealant article and automobile roof ditch of FIG. 6 after heating.

The adhesive second layer 2 may be formed, as shown in FIGS. 6 and 7, by a plurality of adhesive microspheres 3 disposed, preferably homogeneously, at intervals from each other. The microspheres 3 can provide a sufficiently adhesive surface, by themselves, to form the adhesive second layer 2. Whether they form all or only part of the adhesive layer 2, the microspheres 3 can form at least one channel that provides a path for air bubbles, trapped at the discontinuities such as the overlap joint of a roof ditch 12, to escape out from under the sealant article 10. Such a channel or channels can act to pump out air bubbles trapped at the discontinuities so that as much of the sealant composition as possible is not separated from the discontinuities by trapped air. As a result, when the sealant composition is softened by heating, more of the sealant composition can contact and seal to the surface of the discontinuities, such as the joint formed at the bottom of the roof ditch shown in FIG. 7. By trapping fewer air bubbles, the formation of a recess or indentation on the exposed surface of the sealant composition is inhibited. Such recesses or indentations can be formed on the exposed surface of the sealant composition as a result of trapped air bubbles expanding by heating and then contracting by cooling. Therefore, with the use of these microspheres 3, excellent appearance can be obtained. Preferable adhesive microspheres 3 are made of an acrylic polymer material. In order to form a good channel, the adhesive microspheres preferably have a particle diameter of 30 to 500 $\mu$m. When the article 10 is heated so that the sealant composition softens and seals to the surface of the discontinuities (for example, the inside surface of the roof ditch 12), the microspheres 3 go into the sealant composition (see, for example, FIG. 7).

Figure 2:
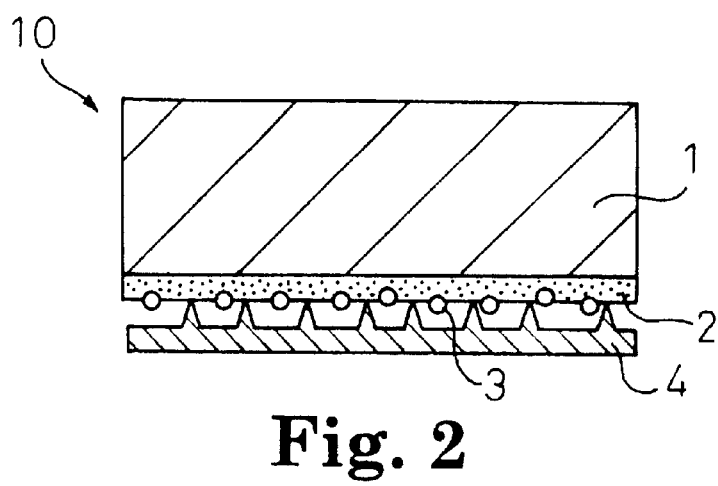
FIG. 2 is a cross-sectional view showing another preferred embodiment of a sealant article according to the present invention.

A release layer may also be provided on the surface of the second layer 2, thereby making it possible to attach rapidly. FIG. 2 shows an embodiment wherein the protrusion surface of the release layer 4 having protrusions on one surface is contacted with the surface of the second layer 2 of a sealant article 10. The exemplary pattern of the protrusions of the release layer 4 used herein will be understood easily from a perspective view of the release layer of FIG. 3.

Figure 3:
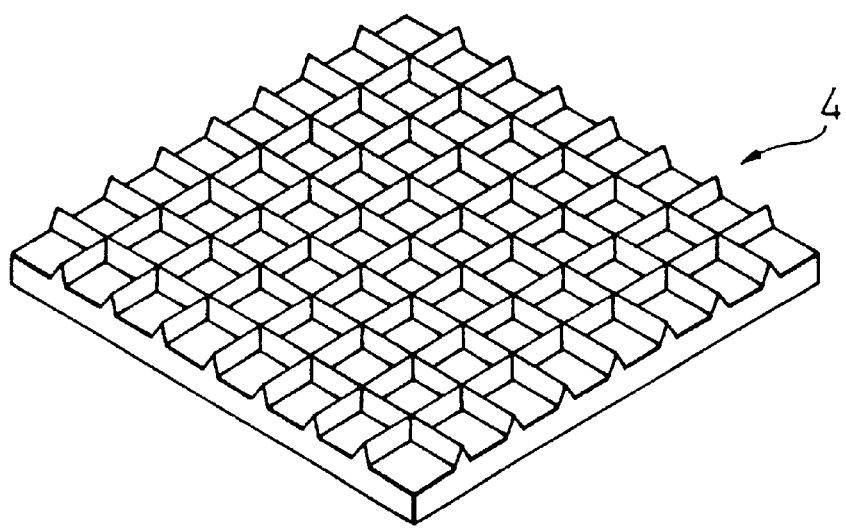
FIG. 3 is a perspective view showing a release layer used in the sealant article shown in FIG. 2.

A particularly desirable release layer 4, in the practice of the present invention, is provided with a plurality of protrusions at intervals on at least one surface thereof. In this case, when the protrusions on the surface of the release layer 4 are at least contacted with the second layer 2, it is possible to partially eliminate the adhesive surface of the second layer 2 in order to form a channel therein. Accordingly, if such a protrusion has a sharp tip portion, the channel can be made more efficiently. Alternatively, the second layer 2 may also be provided with the above adhesive microspheres at intervals from each other or homogeneously. More preferably, a plurality of continuous sharp protrusions, which intersect each other or intersect perpendicularly as shown in FIG. 3, is provided at intervals to thereby form a channel in the second layer 2 through which air bubbles may be pumped out isotropically. Such a release layer 4 is, for example, commercially available from Minnesota Mining and Manufacturing Company as EA LINER™. The protrusions on the release layer 4 can be formed by known microreplication techniques.

Figure 4:
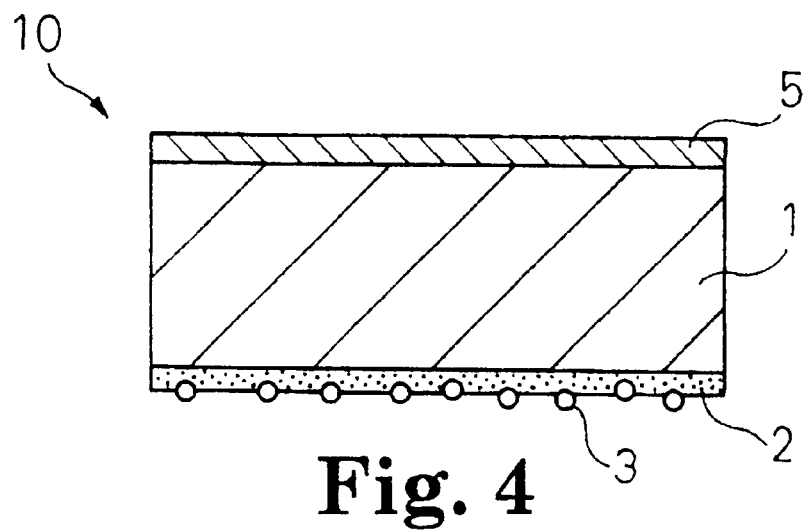
FIG. 4 is a cross-sectional view showing still another preferred embodiment of a sealant article according to the present invention.
Figure 5:
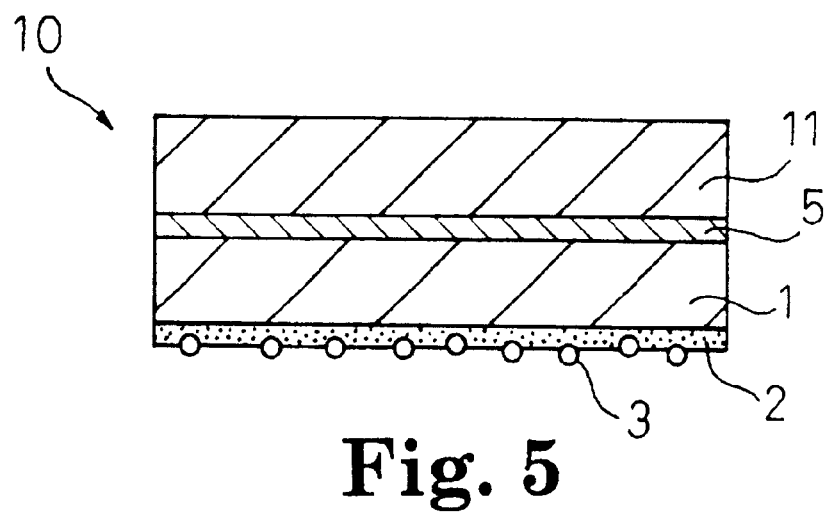
FIG. 5 is a cross-sectional view showing a further preferred embodiment of a sealant article according to the present invention.

In accordance with another preferred embodiment of the present invention, the sealant article 10 of the present invention is provided with a flexible third layer 5 on the surface of the first layer (sealant layer) 1 or the other surface. With such a construction, it is possible to prevent the air bubbles trapped in the sealant article from reaching the surface of the sealant article 10. FIGS. 4 and 5 show two preferable dispositions of the third layer 5. The sealant article 10 of FIG. 4 comprises the third layer 5 on the surface of the first layer 1 opposite the second layer 2. The sealant article 10 of FIG. 5 comprises the third layer 5 between two first layers 1 and 11. Desirable article 10 has flexibility or conformability, and does not trap significant air bubbles at the interface between the first layer 1 and third layer 5. Preferably, such a third layer 5 is, for example, made of polyethylene terephthalate (PET) or polyethylene (PE).

The flexible third layer 5 which is particularly preferred is commercially available, for example, from Nihon Filite KK under the trade mark EXPANCEL™, and this layer has a porosity due to the included plastic bubbles (not shown). The flexible third layer 5 can easily and uniformly disperse the air trapped in the discontinuities by its capillary action and others. In particular, such air dispersion can be accelerated during curing of the first layer 1 with heating. In the subsequent step of cooling the sealant composition to a room temperature, local shrinkage of the trapped air can be inhibited to thereby cause a tendency of uniform shrinkage of the sealant composition. As a result, the formation of local depressions can be easily diminished. Alternatively, regardless of the porosity of the flexible layer 5, fillers consisting of uniformly dispersed whiskers or nonwoven fabrics may be included in the flexible layer 5 to trap air bubbles.

The adhesive layer 2 and release layer 4 described above are respectively applied to not only the sealant composition previously mentioned, but also any other suitable sealant compositions. For example, in view of the application of the adhesive layer 2 and release layer 4, the sealant composition may be made of a thermoplastic polyurethane component or polyester component in place of the thermoplastic polyamide component previously mentioned in the specification of the present application. Particularly, when the sealant composition contains 30–70% by weight of the thermoplastic polyurethane component or polyester component, it displays excellent characteristics in the evaluation of simulated seal sealing, temperature cycle aging and cold temperature elongation or that of lap joint sealing. Such a thermoplastic polyurethane component is commercially available from Takeda Badische Urethane Industries, Ltd. under the trade name of "ET370", and has a melting point of 160° C. and elongation of not less than 100%. The thermoplastic polyester component is commercially available from Huels America Inc. under the trade name of "DINAPOL S1402", and has a melting point of 80° C.

EXAMPLES

The following examples illustrate the present invention but are not to be construed to limit the scope thereof.

Example 1

A thermoplastic polyamide component manufactured by Henkel Co. (trade name: MACROMELT 6238 was prepared. This thermoplastic has a melting point of 135° C. and elongation of 130% at −20° C. An epoxy-containing material (trade name: EPIKOTE 1001) manufactured by Yuka Shell Co. was also prepared. Furthermore, dicyanamide (trade name: EH3636) manufactured by ACR Co. and a triazine derivative (2MZA) manufactured by Shikoku Chemical Co. were mixed in a weight ratio of 2:1 to prepare a curative.

Then, 50 parts by weight of the thermoplastic polyamide component, 40 parts by weight of the epoxy-containing material and 10 parts by weight of the curative were homogeneously mixed to obtain a sealant composition. The sealant composition was charged in an extrusion-forming machine to form into a sheet (sealant article) having a thickness of 2.0 mm.

A test substrate was made in the following manner. First, a glass plate having a width of 25 mm, a length of 150 mm and a thickness of 0.8 mm was attached, in an overlapping condition, onto a strip made of a cold-rolled steel having a width of 25 mm, a length of 150 mm and a thickness of 0.8 mm by using a double-sided adhesive tape. The step from the steel down to the glass surface, formed by the overlapping strip and plate, simulated a seam in the bottom of a roof ditch in a motor vehicle. After the above uncured sheet was cut into a rectangular strip having a length of 100 mm and a width of 20 mm, the strip was placed over one edge of the steel strip and heated at 1 20° C. for 10 minutes and then at 140° C. for 40 minutes. After the test substrate was cooled to room temperature, the simulated seam (represented by the step from the steel strip down to the surface of the glass plate) was examined visually through the glass to determine the seal that had formed. In this example, an acceptable seal was evidenced by the sealant composition having melted and flowed over the steel strip and filled the gap between the surface of the glass plate and the steel strip.

A 1 mm thick cold-rolled steel plate coated with an automotive grade electron deposition coating (E-coating, U-600 Black from Nippon Paint Co., Ltd.) was bent into a square U-shaped channel having a length of 25 mm, a width of 8 mm and a depth of 3 mm to simulate a motor vehicle roof ditch.

After the above uncured sheet was cut into a rectangular strip having a length of 25 mm and a width of 8 mm, the strip was placed in the bottom of the simulated roof ditch channel and heated at 120° C. for 10 minutes to cure the sealant composition. After cooling to room temperature, a standard automotive paint primer of a high-solid type polyester crosslinked with melamine alkyd was sprayed onto the sealant composition and then cured at 140° C. for 30 minutes. After cooling to room temperature, the painted sealant composition was exposed to a temperature cycle aging test.

In the temperature cycle aging test, one cycle consisted of 2 hours at −30° C., followed by 2 hours at room temperature (about 23° C.), and then 2 hours at 70° C. After 5 cycles, the condition of the sealant composition in the simulated roof ditch channel was examined visually. As a result, no difference in the visual appearance of the sealant composition was recognized before and after the test.

The evaluation of cold temperature elongation was performed in the following manner. A section of uncured sealant composition was heated at 140° C. for 30 minutes and then cooled to room temperature. A test specimen of the cured sample was then die cut into a No. 1 dumbbell shape according to Japan Industrial Standard (JIS) K-625 1. The test specimen was then marked to show two parallel lines 40 mm parts from each other. The test specimen was then clamped into the crosshead clamps (clamp distance is about 60–70 mm) of a Tensilon tester (manufactured by Orientec Corporation) fitted with a controlled temperature conditioning chamber. The clamped specimen was conditioned at −20° C. for 20 minutes in the chamber and then stretched at a crosshead speed of 50 mm/min until the specimen broke. The elongation at break was calculated according to the following formula:

Elongation [%]=[(A−40)/40]×100

Wherein A is the distance between the two parallel lines in mm when the specimen broke. The elongation of the sealant composition of this example was 10%. Such elongation will make it possible to prevent defects forming in the sealant, for example cracking, breaking, delaminating or lifting up from the surface to which it has been applied, as a result of stresses caused by ordinary vehicle use at low temperature. Such sealant defects not only permit the intrusion of dirt, moisture, and other undesirable substances through the sealant but can also prevent the stable fixation of a subsequently applied article (e.g., a molding, cap, etc.).

A water soak test was performed in the following manner. A sample was prepared by placing the above uncured sheet (25 mm×40 mm) on a steel plate (65 mm×150 mm) coated with an electron deposition coating, and heating at 120° C. for 10 minutes. After cooling to room temperature, an automotive paint primer was sprayed over the uncured sheet. The sample was cured at 140° C. for 20 minutes. After cooling at least for 10 minutes, an automotive base paint was sprayed over the primer-coated sealant composition. The sample was cured at 140° C. for 20 minutes, and then cooled to room temperature. The electron deposition-coated steel plates, the paint primer, and the base paint that was used were all as described in the temperature cycle aging test. The sample was soaked in water at 40° C. for 250 hours and then visually examined before and after the test. As a result, no difference in the visual appearance was recognized.

The evaluation of lap joint sealing was performed in the following manner. Two 0.8 mm thick electron deposition-coated steel plates like those used in the temperature cycle aging test described above were welded together to form a lap joint. The above uncured sheet (20 mm×100 mm) was applied over the lap joint, heated at 95° C. for 10 minutes, and then at 140° C. for 36 minutes. After cooling, the sheet was examined visually. As a result, the lap joint was sealed as indicated by the desired tendency of the sealant composition to flow into the lap joint and adhere to the steel plate.

Furthermore, a surface appearance test was performed in the following manner. A simulated motor vehicle roof ditch was prepared by bending two electron deposition-coated steel plate (like those described previously in the temperature cycle aging test) into a square-U-shaped channel and spot welding them together in an overlapping configuration. This simulated roof ditch has a width of 20 mm, a depth of 10 mm and a length of 300 mm with the welded seam or joint at the bottom of the ditch. Furthermore, 10 recesses or indentations, each having a diameter of about 5 mm and a depth of about 0.8 mm, were formed in the bottom of the ditch. The above uncured sheet was cut into a strip having a width of 19 mm and a length of 300 mm, and the strip was placed in the bottom of the simulated roof ditch. The test specimen was heated at 100° C. for 10 minutes, followed by at 140° C. for 20 minutes, and then cooled to room temperature. The simulated roof ditch was then visually examined, especially in the area of the indentations. As a result, the surface of the sealant composition formed recesses after the test. Accordingly, regarding the depression region, the sealant composition does not satisfy the desirable tendency and does not sufficiently fill the indentations.

The results of the simulated seam sealing test, temperature cycle aging test, cold temperature elongation and 250 hour water soak test among the above evaluation tests are described in Table 1 below, together with those of Comparative Example 1 described below.

Example 2

The procedure described in Example 1 was repeated, except that the above surface appearance test was performed on a sheet, as described above, having one surface homogeneously coated with adhesive microspheres having a particle diameter of 35 $\mu$m manufactured by Minnesota Mining and Manufacturing Company in a coating weight of 7 g/m$^2$, in place of the uncured sheet used in the above tests. The sealant composition formed the surface with recesses after the test. Accordingly, regarding the depression region, the sealant composition can satisfy the desirable tendency and sufficiently fills the indentations.

Example 3

The procedure described in Example 2 was repeated, except that the above surface appearance test of Example 2 was performed on the sheet whose other side is provided with a film (MELLINEX #316) of a 125 $\mu$m thick polyethylene terephthalate (PET) film manufactured by ICI-Du Pont Co., in place of the uncured sheet with adhesive microspheres used in the above tests. The sealant composition formed the surface with recesses after the test. Accordingly, regarding the depression region, the sealant composition can satisfy the desirable tendency and sufficiently fills the indentations.

Comparative Example 1

A sealant composition was prepared in the same manner as that described in Example 1, except a thermoplastic polyamide component manufactured by Henkel Co. (trade name: MACROMELT 6217) was used instead of MACROMELT 6238. A sheet was formed from the sealant composition. The MACROMELT 6217 thermoplastic polyamide component has a softening point of 112–122° C. and elongation of 8% at −20° C. In nearly the same manner as that described in Example 1, tests for evaluation of the simulated seam sealing, temperature cycle aging, cold temperature elongation and 250 hours water soak were performed. However, as shown in Table 1 below, the elongation of the sealant composition of this comparative example was not more than 1% in the evaluation of the cold temperature elongation. It was also found that the temperature cycle aging caused the comparative sealant composition to crack, break, delaminate or lift up from the surface to which it has been applied as result of stress caused by ordinary vehicle use. Accordingly, when using such a sealant composition, this not only permits the intrusion of dirt, moisture, and other undesirable substances, but unstably fixes the article (e.g., a molding, cap, etc.) to be subsequently applied.

TABLE 1

| Sealant composition | Simulated seam sealing test | Temperature cycle aging | Cold temperature elongation | 250 Hour water soak |
|---|---|---|---|---|
| Example 1 | Good | Good | 10% | No change |
| Comp. Example 1 | Good | No Good | 1% or less | No change |

As described above, according to the present invention, there can be obtained a sealant composition and a sealant article, which are capable of effectively sealing discontinuities while maintaining enough flexibility to withstand stresses experienced during use. Particularly, the sealant composition and sealant article of the present invention can maintain excellent characteristics, e.g. flexibility, under severe cold conditions and, therefore, they can prevent sealant defects such as, for example, cracking, breaking, delaminating, and lifting up from the surface. The avoidance of such sealant defects prevents the intrusion of dirt, moisture, and other undesirable substances through the sealant and into the discontinuities being sealed, and also enables an article (e.g., a molding, cap, etc.) to be fixed in a stable manner onto the applied sealant.

What is claimed is:

1. A sealant composition comprising:
    a curable epoxy-containing material;
    a thermoplastic polyamide component having a melting point lower than a curing temperature of the epoxy-containing material; and
    a curative for the epoxy-containing material,
    wherein the sealant composition has an elongation at −20° C. of at least 2% after curing of the epoxy-containing material.

2. The sealant composition according to claim 1, comprising 10–60% by weight of the epoxy-containing material and 30–70% by weight of the thermoplastic polyamide component.

3. A sealant article comprising one or more layers each of which has a cross-sectional profile having a height and a width, wherein at least one layer is a sealant layer formed from a sealant composition comprising:
    a curable epoxy-containing material;
    a thermoplastic polyamide component having a melting point lower than a curing temperature of the epoxy-containing material; and
    a curative for the epoxy-containing material,
    wherein the sealant composition has an elongation at −20° C. of at least 2% after curing of the epoxy-containing material.

4. The sealant article according to claim 3, further comprising an adhesive layer on a lower surface of the sealant layer.

5. The sealant article according to claim 4, wherein the adhesive layer contains a plurality of adhesive microspheres.

6. The sealant article according to claim 4, wherein an outer surface of the adhesive layer is provided with a release layer on which a plurality of protrusions is formed, and the protrusions are at least in contact with the adhesive layer.

7. The sealant article according to claim 3, wherein a flexible layer is further provided on an upper surface of the sealant layer.

8. The sealant article according to claim 3, wherein a flexible layer is further provided within the sealant layer.

9. The sealant article according to claim 3, wherein the sealant article is dimensioned so as to fit into and seal to a surface within an automobile roof ditch.

10. A discontinuity in combination with a sealant article according to claim 3, wherein the sealant article has been positioned and processed so as to seal the discontinuity.

11. The combination of claim 10, wherein the discontinuity forms part of a vehicle.

12. The combination of claim 10, wherein the discontinuity is a roof ditch.

13. The combination of claim 10, further comprising a layer of paint on the sealant article.

14. A sealant article comprising a sealant layer of a sealant composition according to claim 2, wherein the sealant article is in the form of a rope, tape or strip.

15. The sealant composition according to claim 1, wherein the sealant composition comprises from about 90 parts to about 350 parts by weight of the thermoplastic polyamide component per 100 parts by weight of the epoxy-containing material.

16. The sealant composition according to claim 1, wherein the curative is an imidazole, a dicyanediamide, or a combination thereof.

17. The sealant composition according to claim 1, wherein the sealant composition is a homogeneous single phase mixture.

18. A cured sealant composition, wherein the cured sealant composition comprises the sealant composition according to claim 1 after exposure to sufficient heat to cure the sealant composition.

19. The sealant composition according to claim 1, wherein the sealant composition consists essentially of:
    a curable epoxy-containing material;
    from about 90 parts to about 350 parts by weight of a thermoplastic polyamide component per 100 parts by weight of the epoxy-containing material, wherein the thermoplastic polyamide component has a melting point lower than a curing temperature of the epoxy-containing material; and
    a curative for the epoxy-containing material, wherein the curative is an imidazole, a dicyandiamide, or a combination thereof.

20. The sealant composition according to claim 1, wherein the thermoplastic polyamide has an elongation at −20° C. of 130%.

21. The sealant article according to claim 3, wherein the sealant composition comprises from about 90 parts to about 350 parts by weight of the thermoplastic polyamide component per 100 parts by weight of the epoxy-containing material.

22. The sealant article according to claim 3, wherein the curative is an imidazole, a dicyanediamide, or a combination thereof.

23. The sealant article according to claim 3, wherein the sealant article is in the form of a rope, tape or strip.

24. The sealant article according to claim 3, wherein the sealant composition consists essentially of:
    a curable epoxy-containing material;
    from about 90 parts to about 350 parts by weight of a thermoplastic polyamide component per 100 parts by weight of the epoxy-containing material, wherein the thermoplastic polyamide component has a melting point lower than a curing temperature of the epoxy-containing material; and
    a curative for the epoxy-containing material, wherein the curative is an imidazole, a dicyandiamide, or a combination thereof.

25. The sealant article according to claim 3, wherein the sealant composition is cured.

26. The sealant article according to claim 3, wherein the thermoplastic polyamide has an elongation at −20° C. of 130%.

27. A discontinuity in combination with a sealant article, wherein the sealant article covers at least a portion of the discontinuity, wherein the sealant article comprises one or more layers, wherein at least one layer is a sealant layer formed from a sealant composition comprising:

a curable epoxy-containing material;

a thermoplastic polyamide component having a melting point lower than a curing temperature of the epoxy-containing material; and a curative for the epoxy-containing material, wherein the sealant composition has an elongation at −20° C. of at least 2% after curing of the epoxy-containing material.

28. The combination of claim 27, wherein the discontinuity forms part of a vehicle.

29. The combination of claim 27, wherein the discontinuity is a roof ditch.

30. The combination of claim 27, further comprising a layer of paint on the sealant article.

31. The combination of claim 27, wherein the sealant composition comprises from about 90 parts to about 350 parts by weight of the thermoplastic polyamide component per 100 parts by weight of the epoxy-containing material.

32. The combination of claim 27, wherein the curative is an imidazole, a dicyanediamide, or a combination thereof.

33. The combination of claim 27, wherein the sealant composition consists essentially of:

a curable epoxy-containing material;

from about 90 parts to about 350 parts by weight of a thermoplastic polyamide component per 100 parts by weight of the epoxy-containing material, wherein the thermoplastic polyamide component has a melting point lower than a curing temperature of the epoxy-containing material; and a curative for the epoxy-containing material, wherein the curative is an imidazole, a dicyandiamide, or a combination thereof.

34. The combination of claim 27, wherein the sealant composition is cured.

35. The combination of claim 27, wherein the thermoplastic polyamide has an elongation at −20° C. of 130%.

* * * * *

UNITED STATES PATENT AND TRADEMARK OFFICE
CERTIFICATE OF CORRECTION

PATENT NO.    : 6,489,023 B1
DATED         : December 3, 2002
INVENTOR(S)   : Shinozaki, Kotaro It is certified that error appears in the above-identified patent and that said Letters Patent is hereby corrected as shown below:

Column 8,
Line 31, "at 1 20ºC." should read -- at 120ºC. --.

Column 9,
Line 2, "K-625 1" should read -- K-6251 --.

Signed and Sealed this

First Day of July, 2003

JAMES E. ROGAN
*Director of the United States Patent and Trademark Office*